July 21, 1953 A. HAZELTINE 2,646,532

SYSTEM FOR GENERATING A PERIODIC SCANNING CURRENT

Filed March 8, 1952 3 Sheets-Sheet 1

INVENTOR.
ALAN HAZELTINE

BY Laurence B. Dodds

ATTORNEY

July 21, 1953 A. HAZELTINE 2,646,532

SYSTEM FOR GENERATING A PERIODIC SCANNING CURRENT

Filed March 8, 1952 3 Sheets-Sheet 2

INVENTOR.
ALAN HAZELTINE
BY Laurence B. Dodds
ATTORNEY

SYSTEM FOR GENERATING A PERIODIC SCANNING CURRENT

Filed March 8, 1952 3 Sheets-Sheet 3

INVENTOR.
ALAN HAZELTINE
BY Laurence B. Dodds
ATTORNEY

Patented July 21, 1953 2,646,532

UNITED STATES PATENT OFFICE 2,646,532

SYSTEM FOR GENERATING A PERIODIC SCANNING CURRENT

Alan Hazeltine, Maplewood, N. J., assignor to Hazeltine Research, Inc., Chicago, Ill., a corporation of Illinois Application March 8, 1952, Serial No. 275,601

21 Claims. (Cl. 315—27)

Figure 1:
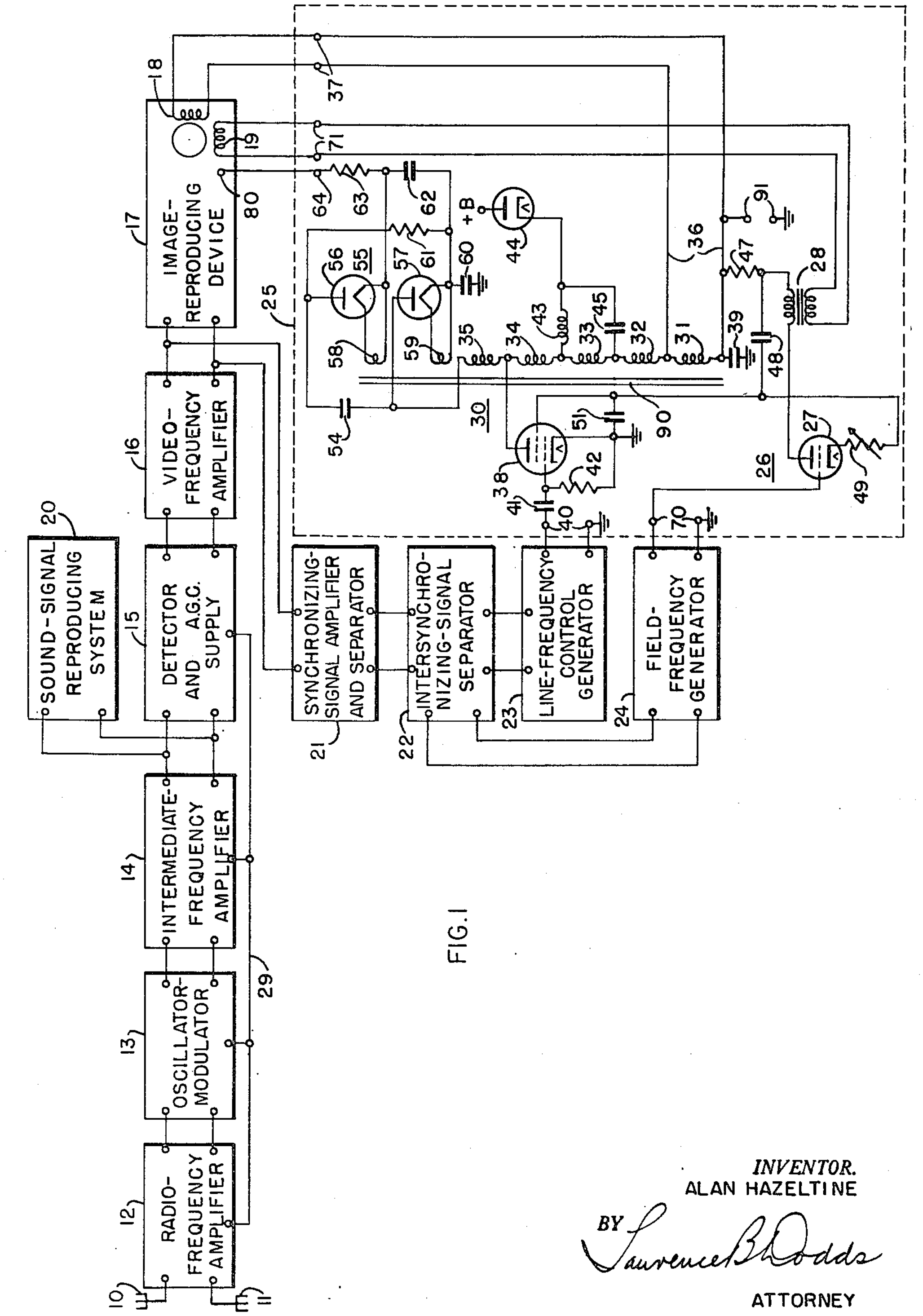

This invention relates to systems for generating periodic scanning currents for a scanning winding of a cathode-ray tube. While the invention is of general application, it has particular utility as a scanning current generating system for a television receiver. The invention is especially useful in the line-frequency scanning circuit of a television receiver and, accordingly, will be described in that environment.

In a television receiver which utilizes magnetic deflection of the electron beam of the cathode-ray display tube thereof, it is customary to pass through the line-scanning winding thereof a current of saw-tooth wave form having relatively long trace intervals and relatively short retrace intervals. A generator which develops a periodic control voltage applies the latter to the input circuit of an amplifier that is capable of delivering relatively large amounts of energy to a load circuit which includes an output transformer and the line-scanning coil of the cathode-ray tube. The foregoing generator is usually referred to in the television art as a "driver stage" for the amplifier, the latter ordinarily being designated as the line-scanning amplifier. This amplifier customarily employs a screen-grid type of tube, such as a tetrode, because of its high mu, its low control electrode-anode capacitance, and its large power-handling capability. The load circuit of the line-scanning amplifier is essentially inductive and includes the usual "efficiency" or "damping" diode for providing a path of reverse-current flow and for developing a so-called unidirectional "boost" voltage for use by other circuits of the receiver. Another unidirectional potential from a source independent of the potential developed by the efficiency diode associated with the amplifier load circuit is ordinarily applied to the screen electrode. A second diode, or a pair of diodes, coupled to the load circuit of the amplifier by a step-up winding of the output transformer, may be utilized in the well-known manner to derive a high unidirectional voltage for application to an anode of the cathode-ray tube.

Although prior systems for generating periodic scanning currents have operated satisfactorily, they are subject to certain disadvantages. The output transformer in such a system is rather large and is more costly to manufacture than is desired. Some such systems have employed output transformers with primary and secondary windings, while others have utilized autotransformers. The last-mentioned transformers are generally somewhat smaller than the former, but still they are more costly and less efficient than is desired. Applicant has determined that some of the disadvantages present in both of these types of output transformers were caused by the flow of two direct currents in certain of the winding portions of the transformers which created very unequal magnetomotive forces therein. These unequal forces in turn caused direct-current saturation effects in the transformer core. More particularly, the magnetomotive forces created by the anode current of the tetrode in the line-scanning amplifier greatly predominated that developed by other currents drawn from the "boost" voltage supply, with the result that the transformer core had a considerable magnetic bias which tended to saturate the core and to require excessive exciting current. The peaks of the required exciting current were reduced by the well-known practice of inserting a nonmagnetic gap in the transformer core, but this gap also required additional exciting current which partly defeats its purpose. Even with such a gap, the operating hysteresis loop of the core will be largely on one side of the flux density axis. This causes the permissible swing in the flux density to be lowered and thus requires more winding turns for the same applied voltage.

Another disadvantage of prior systems is of a different sort. To correct nonlinearity of line-frequency scanning, which would distort the picture on the display tube, it has been customary to break the continuity of the winding of the output autotransformer in order to insert a linearity-correcting network. This entails increased cost of manufacture since the winding operation has to be interrupted for the insertion of insulating cloth between the winding portions at the break. While it has been proposed to connect a linearity-correcting network in the supply lead to the transformer, the proposed arrangement has not been fully effective because it has not permitted the independent correction of the two sources of nonlinearity, namely the resistance of the scanning winding and the customary partial flattening of the face of the display tube, except when this flattening is very slight.

It is an object of the present invention, therefore, to provide a new and improved system for generating the scanning current for a scanning winding of a cathode-ray tube, which system avoids one or more of the above-mentioned disadvantages of prior such systems.

It is another object of the invention to provide a new and improved system for generating the scanning current of a scanning winding of a cathode-ray tube, which system is compact and relatively inexpensive to manufacture.

It is a further object of the invention to provide a new and improved system for generating the scanning current of a scanning winding of a cathode-ray tube, which system is economical of power.

It is an additional object of the invention to provide a new and improved system for generating the scanning current for a scanning winding of a television receiver, which system more fully utilizes the permeability of the core material of the output transformer of the generating system.

It is a still further object of the invention to provide a new and improved system for generating the scanning current for a scanning winding of a television receiver, which system effectively corrects for nonlinearity of the image-reproducing system by the use of only the same apparatus that is needed to achieve the purpose stated in the preceding paragraph.

In accordance with a particular form of the invention, a system for generating a periodic scanning current for a scanning winding of a cathode-ray tube comprises a primarily inductive load circuit including a transformer having a magnetic core and a plurality of winding portions and including a circuit for coupling a scanning winding thereto. The system also includes an electron-discharge device having input electrodes and having output electrodes coupled to the load circuit through a first of the winding portions, and a circuit for applying to the aforesaid input electrodes a control voltage for periodically rendering the device conductive to develop the scanning current in a scanning winding coupled thereto. The generating system further includes a circuit including a rectifier device and a second of the winding portions and cooperating with the electron-discharge device to carry at least a portion of the scanning current. The system additionally includes a circuit including a unidirectional voltage source, a substantial alternating-current impedance, and a third of the winding portions for supplying a direct component of current which includes the direct component of current of the output electrodes. The first winding portion is at least in part distinct from the third winding portion, and the product of the effective number of turns of the third winding portion and the first-mentioned direct component of current is approximately equal to the product of the effective number of turns of the first winding portion and the direct component of output electrode current. The aforesaid third winding portion is wound and connected in such sense relative to the first winding portion that the direct components of current have opposite directions relative to the magnetic core.

Also in accordance with the present invention, a system for generating a periodic scanning current for a scanning winding of a cathode-ray tube comprises a primarily inductive load circuit including an autotransformer having a magnetic core and a series of winding terminals and including a circuit for coupling a scanning winding to two of said terminals. The generating system also includes an electron-discharge device, having input electrodes and having output electrodes including an anode, coupled to the load circuit through a first and a second of the terminals, with the anode connected to the second terminal. The system further includes a circuit for applying to the input electrodes a control voltage for periodically rendering the device conductive to develop the scanning current in a scanning winding coupled thereto, and a circuit including a unidirectional voltage source, a rectifier device and a low-impedance condenser coupled to a third of the terminals intermediate the first and the second terminals and cooperating with the electron-discharge device to carry at least a portion of said scanning current. The generating system additionally includes a circuit including the aforesaid unidirectional voltage source, the rectifier device, and a substantial alternating-current impedance coupled to a fourth of the terminals intermediate the second and the third terminals for supplying a direct component of current which includes the direct component of current of the output electrodes.

For a better understanding of the present invention, together with other and further objects thereof, reference is had to the following description taken in connection with the accompanying drawings, and its scope will be pointed out in the appended claims.

Figure 6:
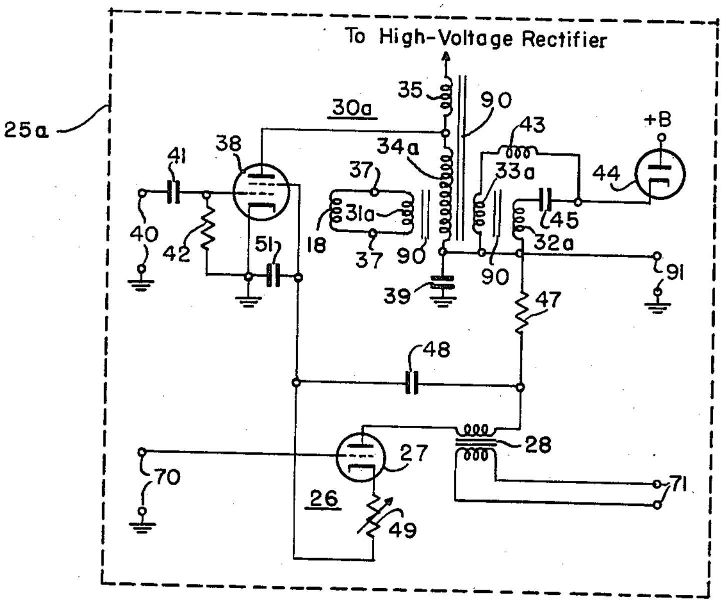

In the accompanying drawings, Fig. 1 is a circuit diagram, partly schematic, of a complete television receiver including a system for generating a scanning current for a scanning winding of a cathode-ray tube in accordance with a particular form of the present invention; Figs. 2–5, inclusive, are graphs utilized in explaining the operation of the generating system of the Fig. 1 receiver; and Fig. 6 is a circuit diagram of a modified form of the invention.

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit in cascade, in the order named, an oscillator-modulator 13, an intermediate-frequency amplifier 14 of one or more stages, a detector and automatic-gain-control or A. G. C. supply 15, a video-frequency amplifier 16 of one or more stages, and a cathode-ray tube image-reproducing device 17 of conventional construction provided with the usual line-frequency and field-frequency scanning windings 18 and 19, respectively, for deflecting the cathode-ray beam in two directions normal to each other. The A. G. C. supply circuit 15 is connected to the input circuits of one or more of the stages 12, 13 and 14 by a control circuit conductor 29. Connected to output terminals of the intermediate-frequency amplifier 14 is a conventional sound-reproducing system 20 which comprises the usual sound intermediate-frequency amplifier, frequency detector, audio-frequency amplifier, and a loudspeaker.

The output circuit of the video-frequency amplifier 16 is coupled to the input circuit of a line-frequency control generator 23 and a field-frequency generator 24 through a synchronizing-signal amplifier and separator 21 and an inter-synchronizing-signal separator 22. The output circuit of the field-frequency generator 24 is coupled to input terminals 70, 70 in the input circuit of a repeater or amplifier 26 including an electron tube 27 having its anode circuit coupled to the field-scanning winding 19 of the image-reproducing device 17 through a transformer 28. The output circuit of the control generator 23 is coupled to the line-scanning winding 18 through terminals 40, 40 and 37, 37 coupled to circuits of a generating system 25 constructed in accordance with the present invention, which generating system effectively comprises the line-frequency generator for the television receiver. Anode excitation potential for the second anode of the image-reproducing device 17 is supplied to a terminal 80 thereof from the generating system 25. The unit 10–25, inclusive, with the exception of the generating system 25, which is constructed in accordance with the present invention and will be described in detail hereinafter, may be of conventional construction and operation so that a detailed description and explanation of the operation thereof are unnecessary herein.

Considering briefly, however, the general operation of the above-described receiver as a whole, signals intercepted by the antenna system 10, 11 are selected and amplified in the radio-frequency amplifier 12 and are supplied to the oscillator-modulator 13 wherein they are converted into intermediate-frequency signals. The latter, in turn, are selectively amplified in the intermediate-frequency amplifier 14 and are delivered to the detector and automatic-gain-control supply 15. The modulation components of the signal are derived by the detector of unit 15 and are supplied to the video-frequency amplifier 16 wherein they are then amplified and supplied to the input circuit of the image-reproducing device 17. A control voltage derived by the automatic-gain-control supply of unit 15 is applied by the control circuit conductor 29 as an automatic-amplification-control bias to the gain-control circuits of units 12, 13 and 14 to maintain the signal input to the detector of unit 15 within a relatively narrow range for a wide range of received signal intensities.

Unit 21 separates the synchronizing signals from the other modulation components of the composite video-frequency signal applied thereto from the video-frequency amplifier 16. The line-synchronizing and field-synchronizing signals derived by the separator 21 are separated from each other by unit 22 and are then supplied to respective ones of the generators 23 and 24 to synchronize the operation thereof. Unit 23 develops a periodic control voltage for application to the generating system 25 to control the operation thereof. An electron beam is produced by the cathode-ray image-reproducing device 17 and the intensity of this beam is controlled in accordance with the video-frequency and control voltages impressed on the brilliancy-control electrode from the video-frequency amplifier 16. Sawtooth current waves generated in the line-frequency generating system 25 and also in the field-frequency generating system including the generator 24 and the amplifier 26 are applied to the scanning windings of the unit 17 to produce scanning fields, thereby to deflect the cathode-ray beam of that unit in two directions normal to each other to trace a rectilinear scanning pattern on the screen of the tube and thereby reconstruct the translated picture.

The sound intermediate-frequency signal is applied by unit 14 to the sound-signal reproducing system 20, wherein it is amplified. The audio-frequency modulation components are derived in a conventional manner by the frequency detector of that unit and are then applied to the audio-frequency amplifier thereof for amplification and application to the loudspeaker for conversion to sound.

*Description of generating system 25 of Fig. 1*

Referring now more particularly to the portion of the Fig. 1 receiver embodying the present invention, the system for generating a periodic scanning current for the line-scanning winding 18 of the cathode-ray image-reproducing device 17 comprises a primarily inductive load circuit including an autotransformer 30 having a magnetic core 90 and a continuous winding including a plurality of winding sections 31, 32, 33, 34 and 35, the first four of these winding sections comprising a first winding portion of the transformer, and including a circuit for coupling the winding 18 to the first-mentioned one of the winding sections. This last-mentioned circuit includes the electrical connetcions 36, 36 connected to the extremities of the winding section 31 and a pair of terminals 37, 37 connected to the line-scanning winding 18. The autotransformer 30 preferably is of the type described and claimed in applicant's copending application Serial No. 275,603, filed concurrently herewith and entitled "Autotransformer for Scanning System of Television Receiver." The generating system 25 also includes an electron-discharge device such as a tetrode 38 having control electrode-cathode input electrodes, anode-cathode output electrodes effectively coupled to the load circuit, and a screen electrode intermediate the output electrodes. The junction of the winding sections 34 and 35 is connected directly to the anode of the tube 38, and the extremity of the winding section 31 remote from the aforesaid junction is coupled to the grounded cathode of the tube through an energy-storage device or condenser 39 of low impedance.

The system 25 also includes a circuit for applying to the input electrodes of the tube 38 a control voltage for periodically rendering that tube conductive to develop a scanning current in the winding 18 when it is coupled in circuit in the manner represented. The control-voltage applying circuit includes the pair of terminals 40, 40 coupled to the output circuit of the generator 23 and coupled to the input electrodes of the tube 38 through a coupling condenser 41 and a grid-leak resistor 42.

The generating system 25 further includes a circuit including a rectifier device and a second of the winding portions and cooperating with the tube 38 to carry at least a portion of the scanning current of line-scanning winding 18. This circuit comprises a voltage-generating circuit including in series relation a unidirectional voltage source +B, a rectifier device 44 having its anode connected to the source just mentioned, a highly capacitive impedance comprising a condenser 45 connected to the cathode of the diode, a second winding portion comprising winding sections 32 and 31 of the transformer 30 for carrying at least a portion of the scanning current, and the condenser 39 for developing a unidirectional voltage across the condenser 39 substantially higher than the source +B.

The generating system 25 additionally includes a direct-current output circuit connected to the described voltage-generating circuit, namely, across condenser 39 of that circuit. This circuit preferably comprises the series combination of the decoupling resistor 47 connected to the junction of the winding section 31 and the condenser 39, the primary winding of the transformer 28 which is in turn connected to the anode of the tube 27, the space-current path of the tube 27, an adjustable cathode resistor 49 for that tube, and the screen electrode-cathode path of the tube 38. A generating system including the series combination referred to above is more fully described and claimed in applicant's copending application Serial No. 275,602, filed concurrently herewith and entitled "System for Generating Scanning Currents." The output circuit under consideration also includes a pair of terminals 91, 91 for supplying energy to suitable other direct-current circuits (not shown) of the television receiver requiring such energy. By-pass condensers 48 and 51 serve to decouple the field-scanning and line-scanning systems.

Since the line-scanning coil 18 is in parallel with winding section 31, direct current flowing through the direct-current output circuit is in part diverted from winding section 31 by the line-scanning coil. In considering the magnetic bias of the transformer core, such diverted current is equivalent to a reduction in the number of turns of winding section 31, leaving an effective number of turns equal to the actual number multiplied by the ratio of the resistance of the line-scanning winding to the sum of the resistances of the line-scanning winding and winding section 31. The expression "effective number of turns" as used hereinafter refers to the actual number of turns of all other winding sections and to the number of turns of winding section 31 multiplied by the ratio just stated.

The system 25 for generating a periodic scanning current also includes the source +B, the rectifier device 44, a substantial alternating-current impedance which preferably is a highly inductive impedance or inductor 43, and a third winding portion comprising the winding sections 33, 32 and 31 for supplying through the inductor 43 a direct component of current which includes the direct component of current translated by the winding section 34 to the output electrodes of the tube 38. The product of the total effective number of turns of the third winding portion (comprising the winding sections 33, 32 and 31) and the first-mentioned direct component of current (that is, the direct component flowing through the inductor 43) is approximately equal to the product of the total effective number of turns of the first winding portion (comprising the winding sections 34, 33, 32 and 31) and the direct component of output electrode current of the tube 38 which flows in the winding section 34. In practical embodiments of the invention, the first-mentioned product may be a substantial fraction of or within the range of 0.9 to 1 times the second-mentioned product. In a particular embodiment of the invention, the products, taken in the order mentioned above have a ratio of substantially 0.98. The third winding portion of the transformer 30 is wound and connected in such sense relative to the first winding portion that the direct components of current in the transformer have opposite directions relative to the magnetic core 90. It will be observed that the first winding portion is at least in part distinct from and has a greater number of turns than the third winding portion. Also the third winding portion has a greater number of turns than the second winding portion.

The condenser 45 and the inductor 43 are preferably so proportioned that current flowing in the condenser builds up across the condenser a voltage which is impressed on the line-scanning winding 18 after transformation and which at least in part compensates for the nonlinearity in the scanning of the cathode-ray image-reproducing device 17.

The load circuit of the generating system 25 also includes a high-voltage rectifier system such as a conventional voltage-doubler circuit 55 including a pair of diode rectifier devices 56 and 57. The anodes of the diodes are connected together through a condenser 54 and are also connected to one extremity of the step-up winding section 35 of the transformer 30. Auxiliary transformer windings 58 and 59 supply heater current to the filaments for the cathodes of the diodes 56 and 57 and the cathode of the latter is connected to ground through a storage condenser 60. The anode of the diode 56 is connected to the cathode of the diode 57 through a resistor 61. The cathode of the diode 56 is connected to the cathode of the diode 57 through a storage condenser 62 and to the anode terminal 80 of the image-reproducing device 17 through a protective resistor 63 in an output terminal 64.

*Explanation of operation of generating system 25 of Fig. 1*

Figure 2:
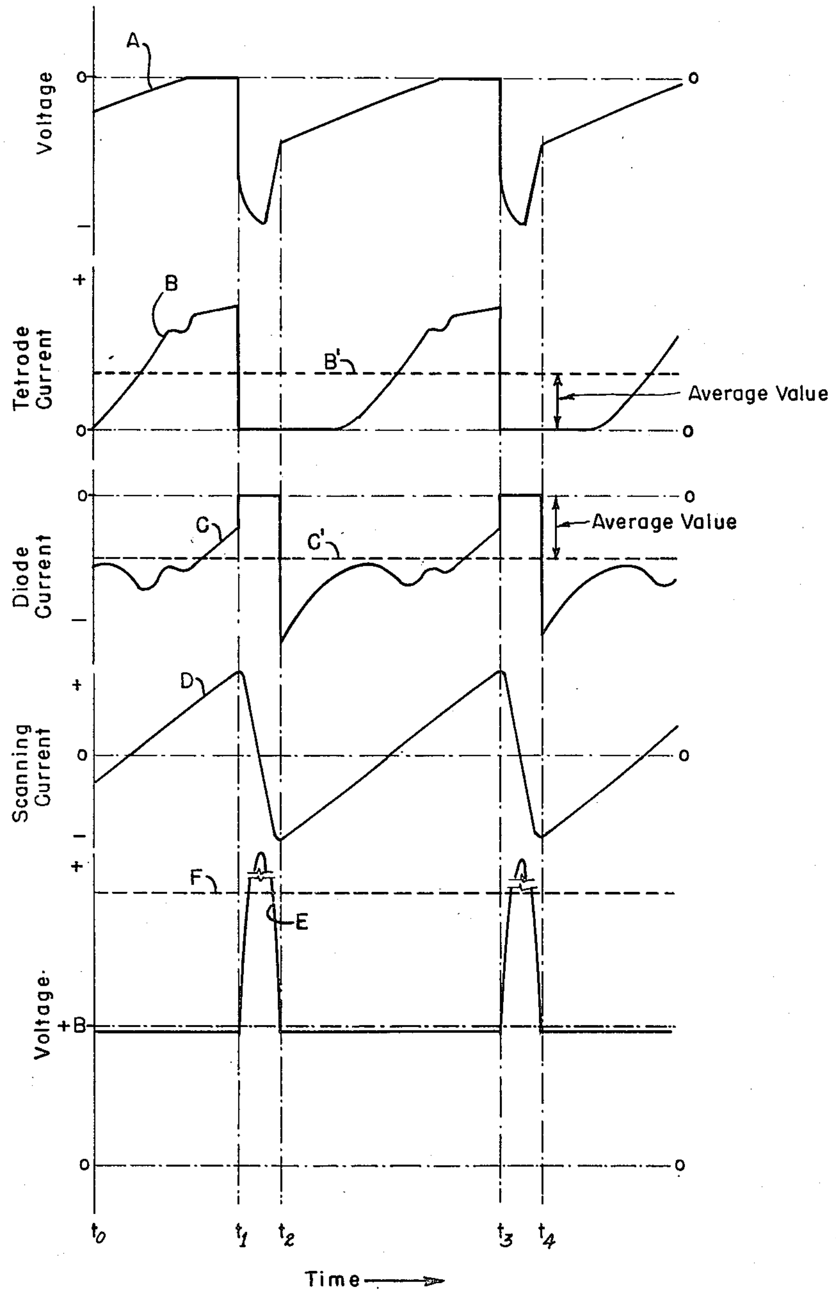

In considering the general operation of the generating system 25 of Fig. 1, it will be assumed initially that the system has been in operation for a brief interval of time to establish a cutoff bias on the control electrode of the tube 38 and operating potentials across the various other portions of the system such as the storage condenser 39. Curve A of Fig. 2 represents the periodic voltage applied to the input circuit of tube 38 from the generator 23, the first intervals $t_0$—$t_1$ representing the latter portion of a trace interval. During the interval $t_1$—$t_2$, hereinafter referred to as a retrace interval, the periodic voltage has a negative pulse portion of relatively large value. During the succeeding interval $t_2$—$t_3$, referred to as a trace interval, this potential increases gradually to zero, where it remains until time $t_3$ whereupon it changes abruptly to a relatively large negative value. At time $t_4$, which corresponds to the end of another retrace interval, the periodic voltage again commences to increase gradually to zero, thus forming a succeeding trace interval.

At time $t_0$ the periodic voltage applied to the control electrode of the tube 38 exceeds its cutoff level and anode current begins to flow in the tube and increases in the manner represented by curve B. At this time the diode 44 is also conducting rather heavily and the diode current has the wave form represented by curve C. The current flowing in the line-scanning winding 18 effectively constitutes the algebraic sum of the alternating components of current flowing in the diode 44 and in the output circuit of the tetrode 38, each current being reduced to the number of turns in winding portion 31. This resultant current has a substantially saw-tooth wave form as represented by curve D of Fig. 2. At time $t_1$, the negative pulse portion of the periodic voltage of curve A applied to the control electrode of the tube 38 drives the tube to anode-current cutoff. As a result of this sudden interruption of anode current, the magnetic fields in the essentially inductive load circuit comprising the transformer 30 and the line-scanning winding 18 collapse and the distributed and other circuit capacitances of the load circuit permit free oscillations to take place, the free oscillation frequency being from three to four times that of the line-scanning frequency. As a result of the collapse of the magnetic field in the transformer 30, a positive voltage pulse having a nearly sinusoidal rise is momentarily induced at the various terminals of the winding above the junction of the condenser 39 and the resistor 47. The positive potential applied to the cathode of the diode 44 exceeds that of the source +B and renders the diode non-conductive at substantially the start of the retrace interval $t_1$—$t_2$ as represented in curve C. During this interval, the current flowing in the line-scanning winding 18 decreases rapidly from a positive value to zero and then swings negative as shown by curve D. The reversal of the current flow in the line-scanning winding during the retrace interval $t_1$—$t_2$ causes the electron beam to be deflected quickly in a direction opposite to that during the preceding trace interval. The described retrace operation occurs in slightly more than one-half the cycle of the free oscillation frequency of the load circuit.

When the trailing edge of the positive voltage pulse developed at the junction of the winding sections 32 and 33, and hence effectively at the cathode of the diode 44 as a result of the translation of that pulse by the condenser 45, drops at approximately time $t_2$ to a value less than that of the source +B applied to the anode as in curve E, the diode again becomes conductive and initiates the start of the trace interval $t_2$—$t_3$. The current in the line-scanning winding 18 at the start of this retrace interval is negative and begins to decrease approximately linearly in the manner represented by curve D. The diode current flowing during the initial portion of the trace interval $t_2$—$t_3$ is also effective to supply energy to the storage condenser 39 and the latter assumes an average potential substantially greater than that of the source +B, this potential being represented by the broken-line curve F of Fig. 2. Early in the trace interval $t_2$—$t_3$, the potential of curve A applied to the control electrode of the tube 38 is again effective to overcome the bias thereon and render that tube conductive. During the remainder of the trace interval, the currents flowing in the diode 44 and the tube 38 develop a positive-going approximately linear portion of the line-scanning current represented by curve D for deflecting the cathode-ray beam of the device 17 in the well-known manner. At time $t_3$ the negative pulse applied to the control electrode of the tube 38 suddenly renders the tube nonconductive, and during the retrace interval $t_3$—$t_4$ the cycle of operation explained above in connection with the retrace interval $t_1$—$t_2$ is repeated.

During retrace intervals such as $t_1$—$t_2$ and $t_3$—$t_4$, large positive voltage pulses of the type represented by curve E are developed at the junction of the voltage step-up winding section 35 and the anode of the diode 57 in the manner previously explained. The diodes 56 and 57 of the voltage-doubler circuit 55 rectify these pulses in the well-known manner and derive across the condensers 60 and 62 a high unidirectional voltage which is delivered through the resistor 63 to the terminal 64 for application through the terminal 80 to an anode of the image-reproducing device 17.

As previously mentioned, there is developed across the condenser 39 an average unidirectional potential of positive polarity which is substantially greater than that of the source +B, this voltage being usually about twice that of the source. The tube 38 requires a screen potential much lower than that developed across the condenser 39 and the proper operating potential therefor is derived by the circuit comprising the voltage-dropping resistor 47, the tube 27, and the resistor 49 in the manner fully explained in applicant's above-mentioned copending application Serial No. 275,602.

Figures 3, 4, 5:
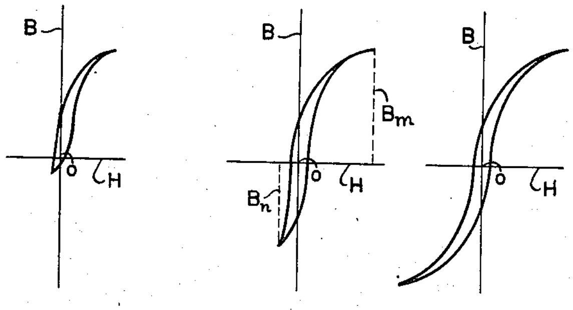

Considering now the manner in which the magnetic bias developed in the transformer core is reduced to effect the improved voltage-generating system 25 in accordance with the present invention, the autotransformer 30 translates two direct components of current in opposite directions in certain of the winding portions thereof. The first of these components is the direct component of anode current for the tube 38 and this is conducted in what may be referred to for convenience as being in the upward direction by the winding 34. The other of these components of direct current is that conducted in what may also be referred to for convenience as being in the downward direction by the series combination of the winding sections 33, 32 and 31, the winding section 31 having a reduced number of effective turns by reason of the direct current diverted from it by the line-scanning winding 18, as described previously. The last-mentioned direct component of current represents that supplied to any direct-current circuit connected to the terminals 91, 91 and the circuit including the resistor 47, the tube 27, and the cathode resistor 49 supplying screen-electrode current to the tube 38. In prior generating systems of the type under consideration, the magnetomotive force developed by the flow in the transformer of the direct component of the tetrode anode current greatly predominated the magnetomotive force developed by the flow of the direct component of current into the so-called "boost" condenser corresponding to the condenser 39. This undesirably caused the transformer core to have a considerable magnetic bias which tended to produce a direct-current saturation of the core. Fig. 3 represents the hysteresis loop for a transformer which is operated under such conditions and it will be seen therefrom that the operation is almost entirely on one side of the magnetic flux density axis, thus lowering the permissible swing in flux density and requiring more winding turns to develop the same voltage.

As previously mentioned, the diode 44 translates for application to the transformer 30 a current having the wave form represented by curve C of Fig. 2. This current contains a direct component which, in accordance with the present invention, is effectively translated by the inductor 43 and is represented graphically in Fig. 2 by the curve C'. Also in accordance with the invention, the alternating component represented by curve C is translated by the condenser 45 and is employed to supply a portion of the saw-tooth current in the scanning winding 18. The average or direct component of tetrode current is represented by curve B' of Fig. 2 and the direct component of current (not shown) supplied to the voltage-dropping and screen-electrode circuit of tube 38 and to the circuit connected to the terminals 91, 91 is equal to the difference between the direct component of diode current and the direct component of the anode current of the tetrode. By employing the inductor 43 to conduct mainly the direct component of diode current and the condenser 45 to conduct the alternating component thereof and also by connecting those elements to selected portions of the autotransformer 30, a satisfactory working balance or a substantially exact balance of the direct-current magnetomotive forces developed in the transformer 30 may be effected, thereby substantially reducing or effectively eliminating the undesired direct-current saturation of the transformer core.

In the Fig. 1 embodiment of the invention, this substantial reduction of the direct-current bias of the transformer core occurs when the various circuits are connected to the transformer 30 as represented and when the product of the total effective number of turns of the above-mentioned third winding portion comprising the winding sections 33, 32 and 31 and the direct-current component of the current through diode 44 and inductor 43 is approximately equal to that produced by the product of the effective number of turns of the first winding portion comprising sections 34, 33, 32 and 31 by the direct component of anode current of the tube 38.

A satisfactory working balance of the direct-current magnetomotive forces in the transformer 30 results when the first of these products is within the range of 0.9 to 1 times the second of the products. For such a condition, Fig. 4 represents the hysteresis loop for the transformer 30. It will be seen from this figure that the magnetic flux density $B_n$ in the weaker direction is a substantial fraction of the maximum flux density $B_m$ in the other direction. This results in a range of flux density nearly twice that available in a transformer having a hysteresis loop such as that of Fig. 3. When an exact magnetic balance is achieved, the hysteresis loop for the transformer 30 appears as represented in Fig. 5 of the drawings and the fundamental operation of the transformer is then not affected by the direct components of current in the various portions of the autotransformer. The realization of a satisfactory working balance of the direct-current magnetomotive forces in the transformer 30 permits the use of a negligible nonmagnetic air gap in the transformer core, reduces the size of the transformer core and the exciting current required to operate the transformer, and allows the use of fewer turns for a desired voltage, thus permitting the transformer to be smaller and less costly.

There are advantages in connecting inductor 43 to such a point in the transformer winding of Fig. 1 that the winding section 33 has fewer turns than would give an exact magnetic balance. First, the self-inductance of inductor 43 can then be made lower, thus lowering its cost and tending to lower its resistance and the power loss in this resistance. Second, the alternating-current load of inductor 43 on the system can be made lower, even with a lowered self-inductance.

It should be pointed out that substantial reduction in magnetic bias is accomplished in the circuit of Fig. 1, not only by magnetic balance as described previously, but also by the lowering of the number of turns through which flows the direct component of anode current of the tube 38, due to the connection of inductor 43 to a terminal intermediate the terminals connected to this anode and to condenser 45. In an extreme case, substantial benefit can be secured by this connection even when there is no direct-current output circuit connected across condenser 39, so that no direct component of current flows in winding sections 33, 32 and 31.

As is well known, the picture reproduced on the display tube of a television receiver is subject to distortion in a horizontal direction, such distortion being commonly referred to as nonlinearity with respect to time of the horizontal displacement of the bright spot produced on the screen by the moving electron beam. This nonlinearity is due to two independent effects: (1) the resistances of the scanning winding, of parts of the output transformer winding, and of the diode rectifier, which tend to cause the reproduced picture to be relatively spread out near the beginning of each line and condensed near the end, and (2) the customary partial flattening of the face of the display tube relative to the curvature it would have if the radial length of the electron path from the center of the scanning winding were constant, this flattening tending to cause the picture to be relatively spread out at its sides relative to the center. To correct for these effects, there are inserted effectively in series with the scanning winding a voltage which varies linearly with time to correct the first effect and a voltage which varies parabolically with time to correct the second effect.

In accordance with the present invention, both of these correcting voltages are inserted across the condenser 45 of Fig. 1 by alternating components of current flowing through this condenser. The linearly varying voltage is produced by a component of current which is of rectangular wave form and has a constant value in one direction during the trace interval and a much higher value in the other direction during the shorter retrace interval. Such a component of current is supplied by the rectifier diode 44, whose total current flows in one direction throughout trace and is interrupted during retrace, as shown by curve C in Fig. 2. The total change in the linearly varying voltage during trace is, in fact, nearly equal to the direct component of rectifier current multiplied by the retrace time and divided by the capacitance of condenser 45, and this relation determines the required capacitance.

The parabolic correcting voltage required for flat-face correction is produced by a component of current through condenser 45 having a saw-tooth wave form, like the current of the scanning winding, as shown by curve D in Fig. 2. The current of the rectifier diode 44 contains such a saw-tooth component of current, but of quite insufficient magnitude, so the greater part of the required saw-tooth component is obtained from the alternating component of current flowing through inductor 43 of Fig. 1, which current is of nearly saw-tooth form because (like the current of the scanning winding) it is due to the voltage of a portion of the transformer winding, the voltage across condenser 45 being relatively small. Thus, the required parabolic component of correcting voltage determines the self-inductance of inductor 43, other relevant factors being already fixed by other considerations.

From the three preceding paragraphs, it will be seen that the system shown in Fig. 1 serves not only to reduce or eliminate the deleterious effect of magnetic bias in the transformer core, as described previously, but also for linearity correction, merely by suitable choice of the capacitance of condenser 45 and the self-inductance of inductor 43, without the necessity of adding any parts. Of course, the system can be advantageously used for linearity correction alone, in cases where magnetic bias may not constitute a problem.

*Description of generating system of Fig. 6*

Fig. 6 is a circuit diagram representing a modified form of the invention which is essentially similar to the generating system of Fig. 1, similar circuit elements being designated by the same reference numerals and analogous circuit elements by the same reference numerals with the subscript *a*. The generating system of Fig. 6 differs from that of Fig. 1 in that the transformer **30*a* is not an autotransformer but goes to the opposite extreme of maintaining the winding portions distinct from each other. The first winding portion 34*a* is connected between the anode of the tube 38 and the high-potential terminal of the condenser 39. A second winding portion 32*a* is coupled between the aforesaid terminal of condenser 39 and the cathode of the diode 44 through the condenser 45. A third winding portion 33*a* is coupled between the high-potential terminal of the condenser 39 and the cathode of the diode 44 through the inductor 43. The line-scanning winding 18 is coupled to the winding section 31*a* which is in turn inductively coupled to the other winding portions. The product of the number of turns of the third winding portion 33*a* and the direct component of current translated through the inductor 43 is approximately equal to the product of the number of turns of the first winding portion 34*a* and the direct component of output electrode current of the tube 38. The third winding portion 33*a* is wound and connected in such sense relative to the first winding portion 34*a* that the direct components of current in the transformer have opposite directions relative to the magnetic core 90. The operation of the Fig. 6 generating system 25*a* is essentially similar to that of the generating system 25** of Fig. 1 and, therefore, will not be repeated.

The following circuit constants are given as illustrative values of circuit elements which may be used in the generating system 25 of Fig. 1:

| | |
|---|---|
| Tube 27 | Type 6SN7 |
| Tube 38 | Type 6BQ6-GT |
| Tube 44 | Type 6V3 |
| Resistor 42 | 470 kilohms |
| Resistor 47 | 1 kilohm |
| Resistor 49 | 1 kilohm (max.) |
| Condenser 39 | 8 microfarads |
| Condenser 41 | 0.01 microfarad |
| Condenser 45 | 0.022 microfarad |
| Condenser 48 | 50 microfarads |
| Condenser 51 | 10 microfarads |
| Transformer 30, wound as a single coil with #34 single silk enamel wire and the following numbers of turns: | |
| Winding portion 31 | 200 turns |
| Winding portion 32 | 100 turns |
| Winding portions 33, 34 | Each 80 turns |
| Winding portion 35 | 240 turns |
| Inductor 43 | 30 millihenries |
| Winding 18 | 13.3 millihenries |
| +B | 220 volts |
| Input voltage to tube 38 | 100 volts peak-to-peak |
| Screen-electrode voltage to tube 38. | 130 volts average |
| Line-scanning frequency | 15,750 cycles/second |
| Direct component of current in inductor 43. | Approximately 123 milliamperes |
| Direct component of anode current of tube 38. | Approximately 100 milliamperes |
| Direct component of current in "boost" load circuits. | Approximately 23 milliamperes |

From the foregoing description, it will be clear that a generating system in accordance with the present invention is effective to make full use of the magnetic material in the core of the output transformer thereof and is thus economical to operate.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for generating a periodic scanning current for a scanning winding of a cathode-ray tube comprising: a primarily inductive load circuit including an autotransformer having a magnetic core and a plurality of winding portions and including a circuit for coupling a scanning winding thereto; an energy-storage device; an electron tube having control electrode-cathode input electrodes and having anode-cathode output electrodes coupled to said load circuit through a series circuit including a first of said winding portions and said energy-storage device; a circuit for applying to said input electrodes a control voltage for periodically rendering said tube conductive to develop said scanning current in a scanning winding coupled thereto; a voltage-generating circuit including said energy-storage device, a unidirectional voltage source, a rectifier device, a low-impedance condenser, and a second of said winding portions and cooperating with said tube to carry at least a portion of said scanning current and to develop across said energy-storage device a unidirectional voltage substantially higher than that of said source; a direct-current output circuit connected to said energy-storage device; and a circuit including said unidirectional voltage source, said rectifier device, an inductor, and a third of said winding portions having a greater number of turns than said second winding portion for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

2. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

3. A system for generating a periodic scanning current for a scanning winding of a cathode-ray tube comprising: a primarily inductive load circuit including a transformer having a magnetic core and a plurality of winding portions and including a scanning winding coupled thereto; an electron-discharge device having input electrodes and having output electrodes coupled to said load circuit through a first of said winding portions; a circuit for applying to said input electrodes a control voltage for periodically rendering said device conductive to develop said scanning current in said scanning winding; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

4. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being a substantial fraction of the product of the effective number of turns of said first winding portion and said direct component of output electrode current, and said third winding portion being wound and connected in such sense relative to said first winding portion that said direct components of current have opposite directions relative to said magnetic core.

5. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being within the range of 0.9 to 1 times the product of the effective number of turns of said first winding portion and said direct component of output electrode current, and said third winding portion being wound and connected in such sense relative to said first winding portion that said direct components of current have opposite directions relative to said magnetic core.

6. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current and the product of the effective number of turns of said first winding portion and said direct component of output electrode current having a ratio of substantially 9/10, and said third winding portion being wound and connected in such sense relative to said first winding portion that said direct components of current have opposite directions relative to said magnetic core.

7. A system for generating a periodic scanning current for a scanning winding of a cathode-ray tube comprising: a primarily inductive load circuit including an autotransformer having a continuous winding, a magnetic core, and a plurality of winding portions and including a circuit for coupling a scanning winding thereto, said winding portions being at least in part distinct from one another; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

8. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, an inductor, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

9. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion effectively having a greater number of turns than said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

10. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a unidirectional voltage source, a rectifier device, a low-impedance condenser, and a second of said winding portions and cooperating with said electron-discharge device to carry at least a portion of said scanning current; and a circuit including said unidirectional voltage source, said rectifier device, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

11. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a voltage-generating circuit including a unidirectional voltage source, a rectifier device, a low-impedance condenser, and a second of said winding portions for developing a unidirectional voltage substantially higher than that of said source; and a circuit including said unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

12. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a voltage-generating circuit including a unidirectional voltage source, a rectifier device, a low-impedance condenser, a second of said winding portions, and an energy-storage device for developing across said energy-storage device a unidirectional voltage substantially higher than that of said source; and a circuit including a unidirectional voltage source, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

13. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a voltage-generating circuit including a unidirectional voltage source, a rectifier device, a low-impedance condenser, a second of said winding portions and an energy-storage device for developing across said energy-storage device a unidirectional voltage substantially higher than that of said source; a direct-current output circuit connected to said energy-storage device; and a circuit including said unidirectional voltage source, said rectifier device, a substantial alternating-current impedance, and a third of said winding portions for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

14. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions having a greater number of turns than said second winding portion for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

15. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said first winding portion being at least in part distinct from and having a greater number of turns than said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of currents have opposite directions relative to said magnetic core.

16. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including in series a unidirectional voltage source, a substantial alternating-current impedance, and a third of said winding portions for supplying through said third winding portion a direct component of current which includes the direct component of current of said output electrodes; said first winding portion being distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

17. A system for generating a periodic scanning current for a scanning winding of a cathode-ray tube comprising: a primarily inductive load circuit including a transformer having a magnetic core and a plurality of winding portions and including a circuit for coupling a scanning winding thereto; an electron-discharge device having input electrodes and having output electrodes coupled to said load circuit through a first of said winding portions; a circuit for applying to said input electrodes a control voltage for periodically rendering said device conductive to develop said scanning current in a scanning winding coupled thereto; a circuit including a rectifier device and a second of said winding portions and cooperating with said electron-discharge device to carry at least a portion of said scanning current; and a circuit including a unidirectional voltage source, a substantial alternating-current impedance, and a third of said winding portions for supplying a direct component of current which includes the direct component of current of said output electrodes; said winding portions being distinct from each other and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

18. A system for generating a periodic scanning current for a scanning winding of a cathode-ray tube comprising: a primarily inductive load circuit including an autotransformer having a magnetic core and a series of winding terminals and including a circuit for coupling a scanning winding to two of said terminals; an electron-discharge device, having input electrodes and having output electrodes including an anode, coupled to said load circuit through a first and a second of said terminals with said anode connected to said second terminal; a circuit for applying to said input electrodes a control voltage for periodically rendering said device conductive to develop said scanning current in a scanning winding coupled thereto; a circuit including a unidirectional voltage source, a rectifier device, and a low-impedance condenser coupled to a third of said terminals intermediate said first and said second terminals and cooperating with said electron-discharge device to carry at least a portion of said scanning current; and a circuit including said unidirectional voltage source, said rectifier device, and a substantial alternating-curent impedance coupled to a fourth of said terminals intermediate said second and said third terminals for supplying a direct component of current which includes the direct component of current of said output electrodes.

19. A system for generating a periodic scanning current for a scanning winding of a cathode-ray tube comprising: a primarily inductive load circuit including an autotransformer having a magnetic core and a series of winding terminals and including a circuit for coupling a scanning winding to two of said terminals; an electron-discharge device, having input electrodes and having output electrodes including an anode, coupled to said load circuit through a first and a second of said terminals with said anode connected to said second terminal; a circuit for applying to said input electrodes a control voltage for periodically rendering said device conductive to develop said scanning current in a scanning winding coupled thereto; a circuit including a unidirectional voltage source, a rectifier device, and a low-impedance condenser coupled to a third of said terminals intermediate said first and said second terminals and cooperating with said electron-discharge device to carry at least a portion of said scanning current; and a circuit including said unidirectional voltage source, said rectifier device, and an inductor coupled to a fourth of said terminals intermediate said second and said third terminals for supplying a direct component of current which includes the direct component of current of said output electrodes.

20. A system for generating a periodic scanning current for a scanning winding of a cathode-ray tube comprising: a primarily inductive load circuit including an autotransformer having a magnetic core and a continuous winding having a plurality of winding portions with a series of winding terminals and including a circuit for coupling a scanning winding to two of said terminals; an electron-discharge device, having input electrodes and having output electrodes including an anode, coupled to said load circuit through a first and a second of said terminals for a first of said winding portions with said anode connected to said second terminal; a circuit for applying to said input electrodes a control voltage for periodically rendering said device conductive to develop said scanning current in a scanning winding coupled thereto; a circuit including a unidirectional voltage source, a rectifier device, and a low-impedance condenser coupled to a third of said terminals for a second of said winding portions intermediate said first and said second terminals and cooperating with said electron-discharge device to carry at least a portion of said scanning current; and a circuit including said unidirectional voltage source, said rectifier device, and a substantial alternating-current impedance coupled to a third of said winding portions with a fourth of said terminals intermediate said second and said third terminals for supplying a direct component of current which includes the direct component of current of said output electrodes; said first winding portion being at least in part distinct from said third winding portion and the product of the effective number of turns of said third winding portion and said first-mentioned direct component of current being approximately equal to the product of the effective number of turns of said first winding portion and said direct component of output electrode current, and said third winding portion being wound and connected in such sense relative to said first winding portion that said direct components of current have opposite directions relative to said magnetic core.

21. A system for generating a periodic scanning current for a scanning winding of a cathode-ray tube comprising: a primarily inductive load circuit including an autotransformer having a ferromagnetic core and a series of winding terminals and including a circuit for coupling a scanning winding to two of said terminals; an electron-discharge device, having input electrodes and having output electrodes including an anode, coupled to said load circuit through a first and a second of said terminals with said anode connected to said second terminal; a circuit for applying to said input electrodes a control voltage for periodically rendering said device conductive to develop said scanning current in a scanning winding coupled thereto; a circuit including a unidirectional voltage source, a rectifier device, and a low-impedance condenser coupled to a third of said terminals intermediate said first and said second terminals and cooperating with said electron-discharge device to carry at least a portion of said scanning current; and a circuit including said unidirectional voltage source, said rectifier device, and a substantial alternating-current impedance coupled to a fourth of said terminals intermediate said second and said third terminals for supplying a direct component of current which includes the direct component of current of said output electrodes; said condenser and said alternating-current impedance being so proportioned that the current flowing through said condenser builds up across said condenser a voltage which is impressed on said scanning winding after transformation and which at least in part compensates for nonlinearity in the scanning of a cathode-ray tube.

ALAN HAZELTINE.

References Cited in the file of this patent

UNITED STATES PATENTS

| Number | Name | Date |
|---|---|---|
| 2,536,839 | Clark et al. | Jan. 2, 1951 |
| 2,536,857 | Schade | Jan. 2, 1951 |
| 2,543,719 | Clark | Feb. 27, 1951 |
| 2,543,720 | Hoyt | Feb. 27, 1951 |
| 2,566,510 | Barco | Sept. 4, 1951 |
| 2,588,659 | Pond | Mar. 11, 1952 |
| 2,611,106 | Fyler et al. | Sept. 16, 1952 |